United States Patent [19]

Parker et al.

[11] Patent Number: 4,866,362
[45] Date of Patent: Sep. 12, 1989

[54] TARGET TRACKING SYSTEM

[75] Inventors: Graham A. Parker, Guildford; René J. R. Mayer, Godalming; Ian G. Taylor; David G. Bailey, both of Guildford, all of England

[73] Assignee: European Economic Community, Luxembourg

[21] Appl. No.: 242,458

[22] Filed: Sep. 9, 1988

[30] Foreign Application Priority Data

Sep. 29, 1987 [LU] Luxembourg .......................... 87003

[51] Int. Cl.4 .............................................. G06F 7/48
[52] U.S. Cl. ................................. 318/368.1; 318/565; 318/567; 318/568.16; 364/513; 901/46; 901/47; 250/561; 356/4.5; 356/373
[58] Field of Search ................................ 318/564–577, 318/622, 627, 628, 640; 364/513, 167.01, 444, 476; 901/2, 3, 7, 8, 9, 10, 15, 19, 20, 21, 23, 24, 32, 33, 35, 44, 46, 47; 350/171; 250/203 R, 228, 491.1, 561, 202; 356/45, 358, 363, 152, 373, 400, 138, 364, 351, 358, 363

[56] References Cited

U.S. PATENT DOCUMENTS

| | | | |
|---|---|---|---|
| 4,523,100 | 6/1985 | Payne | 250/561 |
| 4,602,163 | 7/1986 | Pryor | 250/561 |
| 4,613,942 | 9/1986 | Chen | 250/561 X |
| 4,621,926 | 11/1986 | Merry et al. | 356/363 |
| 4,674,870 | 6/1987 | Cain et al. | 356/400 X |
| 4,685,054 | 8/1987 | Manninen et al. | 250/203 R X |
| 4,696,574 | 9/1987 | Penny | 356/373 X |
| 4,707,129 | 11/1987 | Hashimoto et al. | 356/4.5 |
| 4,714,339 | 12/1987 | Lau et al. | 356/4.5 |
| 4,788,440 | 11/1988 | Pryor | 250/561 |
| 4,790,651 | 12/1988 | Brown et al. | 250/203 R X |

FOREIGN PATENT DOCUMENTS 3425805 1/1986 Fed. Rep. of Germany.

Primary Examiner—William M. Shoop, Jr.
Assistant Examiner—Paul Ip
Attorney, Agent, or Firm—Sughrue, Mion, Zinn, Macpeak & Seas

[57] ABSTRACT

The invention relates to a target tracking system comprising two identical stationary and mutually distant sub-systems (5, 6), each sub-system including a laser source (7, 8) and two perpendicularly pivotable mirrors (10, 11), such that a laser beam can be directed by each sub-system towards the moving target (4). Each sub-system further includes a lateral effect photodetector (18) receiving the light beam after its reflection on the target, which is a reflecting target (4) of the cat's eye type. The pivot positions of the mirrors (10, 11) are adjustable in accordance with control signals derived from the detector (18) such that the respective beam tends to approach the center of the target (4) and that it is reflected in itself. Each mirror is pivoted by a brushless DC motor (12, 13). The common pivot shaft of the motor and of the mirror is further coupled to a digital angle encoder (16, 17) which delivers signals to calculator means (27, 29) for evaluating the present 3D coordinates of the target.

7 Claims, 2 Drawing Sheets

TARGET TRACKING SYSTEM

FIELD OF THE INVENTION

The invention relates to a target tracking system comprising two identical stationary and mutually distant sub-systems, each system including a laser source and two orthogonally pivotable mirrors such that a laser beam can be directed from each sub-system to this target, each sub-system further including a laser light sensitive detector receiving the light beam after its reflection on the target, the latter being a reflecting target of the cat's eye type, the pivot position of the mirrors being adjustable under the control of signals derived from the respective detector, such that the respective beam tends to approach the center of the target and to be reflected in itself, the system further comprising means for detecting the present position of the mirrors, and calculator mneans evaluating the present 3D coordinates of the target on the basis of the mirror pivot positions. The invention has particularly been conceived for remotely measuring the position of a moving robot head.

BACKGROUND OF THE INVENTION

A system of this kind has been disclosed for example in the periodical "Sensor Review" October 1982, pages 180 to 184. It is based on a triangulation method and on the tracking of the head of a robot arm by two separate laser beams. By measuring the compound angles of the two beams and the tracking error, the distance separating the two laser sources being known, the robot arm position can be calculated. Tracking is achieved by transmitting the beam back onto the light sensitive detector which, in this case, is a four-quadrant detector. The electrical signals derived from the detector of each sub-system are used to correct the direction of the associated laser beam such that the beam tends to point directly to the reflecting mirror attached to the head of the robot arm.

The performance of such a system strongly depends on the precision and the speed of the mirror positioning. If this speed is low, the beam strikes the target so far away from its center that the reflected beam is no longer received by the light sensitive detector. The precision of measuring the beam angle limits the resolution that may be achieved in a measuring volume. The resolution diminishes as the volume increases in size.

The system disclosed in the above cited periodical employs moving-iron galvanometers for pivoting and the present mirror position is reported by capacitive position transducers. Experiments have shown that such pivoting means suffer from several drawbacks and thus considerably restrict the measurement accuracy, the repeatability, the tracking speed, the tracking stability and the operational volume.

This is probably due to the following effects:
(a) The mirror is imperfectly mounted between ball bearing supports which thus induce a so-called wobble error,
(b) there has been observed a hysteresis between the mirror movement and the electrical control signals for controlling this movement,
(c) the capacitive transducers do not procure the high precision required.

It is the object of the invention to improve the known target tracking system such that the measurement accuracy, the speed of the target and the working volume of the target can be increased without affecting the tracking stability.

SUMMARY OF THE INVENTION

According to the invention, this object is achieved by the fact that in each sub-system, each mirror is pivotably driven by a brushless DC motor and that the common pivot shaft of the motor and the mirror is further coupled to a digital angle encoder.

A brushless DC motor allows repeatable movements over a wider angular range than a moving-iron galvanometer, and this without loss of dynamic performance.

The motor, the mirror and the encoder are mounted on a common shaft which is supported with high precision by gas bearings. The encoder is either located close to the brushless motor, in which case the mirror is mounted on the shaft in an overhanging position, or else the mirror is located between the motor and its encoder. In this latter case, gas bearings can be located on both sides of the mirror and thus ensure a very stable mounting of the mirror. Both configurations provide very high rigidity for the mirror shaft, thereby minimizing the wobble error.

In both cases, it is useful to control the brushless motor by digital signals which are calculated in accordance with the output signal of the light sensitive detector and with the error signal depending on the instantaneous difference between the present mirror position and the requested position. This kind of mirror control speeds up the correct positioning of the laser beam on the target.

Experiments have shown that four-quadrant detectors according to the cited prior art necessitate a considerable beam diameter expansion in order to obtain simultaneous signals from at least two detector quadrants. When so-called lateral effect photodetectors are used instead of four-quadrant detectors, this limitation is no more valid, as the lateral effect photodetectors supply signals according to the orthogonal coordinates of the center only of the incident beam.

According to a further improvement of the inventive system, each sub-system includes a mode control device distinguishing at least between two modes, i.e. a normal tracking mode and an automatic search mode, in which the mirrors are pivoted according to a predetermined program, the transition between modes being controlled by the detector output signal. Thus, the automatic search mode is enabled automatically if tracking of the head has been lost, for example due to a shadowing effect. As soon as the detector again receives the light reflected during the search mode, the normal tracking mode is again enabled. Provision is also made for manual positioning of the beam for calibration purposes.

According to a further improvement of the inventive system, it is useful to submit the mirror pivot control signals of each sub-system to a dynamic state-space controller conceived to eliminate resonances of the mirror and of its drive amplifiers.

DETAILED DESCRIPTION OF THE INVENTION

Figure 1:
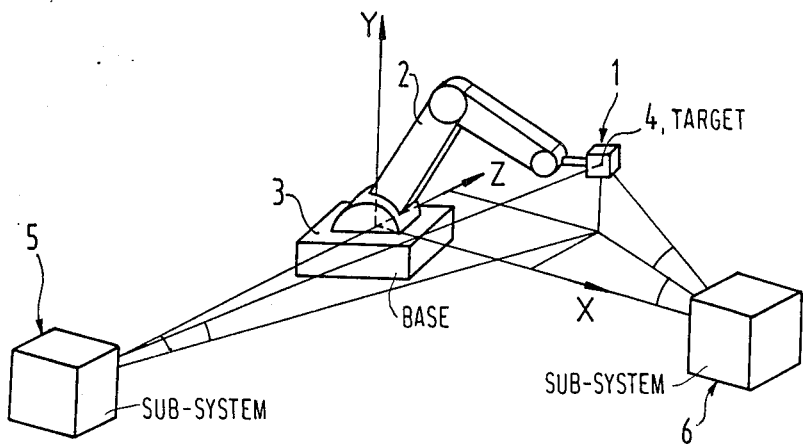

The invention will now be described in more detail in relation to a preferred embodiment which is shown in the drawings.

FIG. 1 shows the overall system in which the invention may be embodied.

Figure 2:
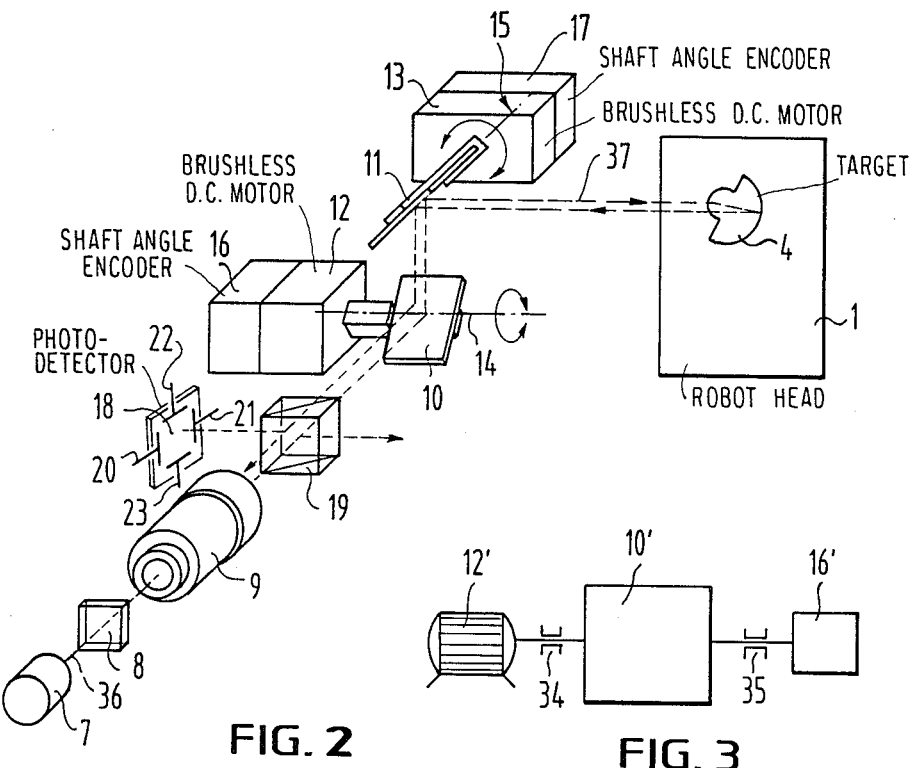

FIG. 2 discloses schematically one sub-system of the system shown in FIG. 1.

Figure 3:
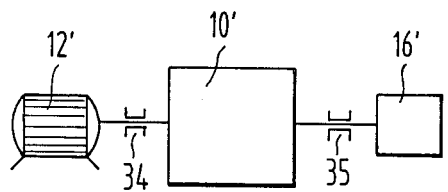

FIG. 3 shows one mirror of the sub-system of FIG. 2 in an alternative arrangement.

Figure 4:
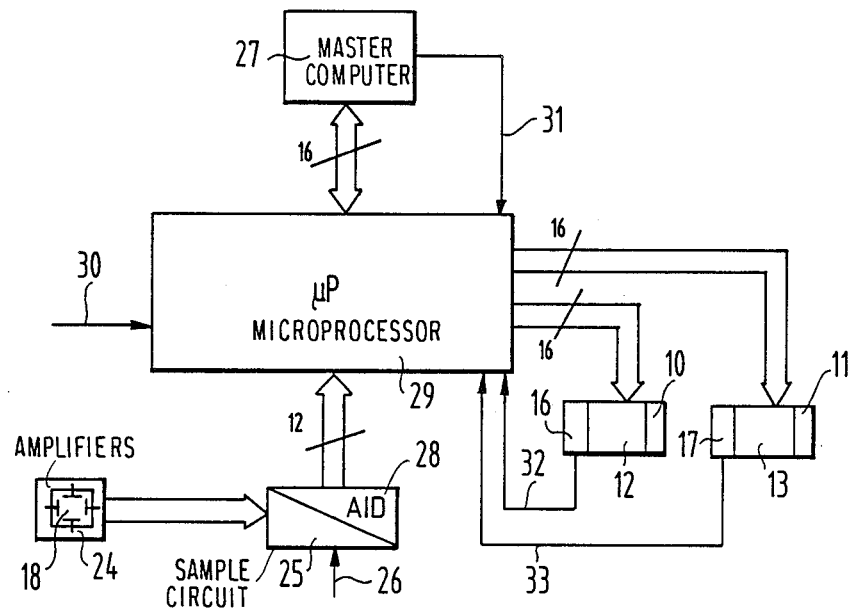

FIG. 4 schematically shows the main flow of the electrical signals in one sub-system such as shown in FIG. 2.

Figure 5:
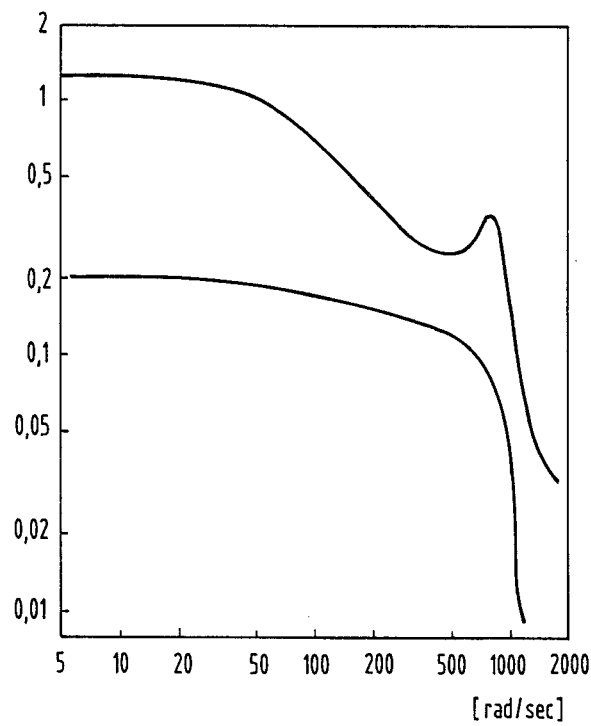

FIG. 5 shows a diagram relating to the dynamic state-space controller included in the system.

Referring now to FIG. 1, the system is applied, for example, to the tracking of a head 1 of a robot 2 with reference to a 3D coordinate system with axes X, Y, Z, represented by arrows and associated to the base 3 of the robot.

A reflecting target 4 is mounted on the robot head 1. The system essentially includes two sub-systems 5 and 6 which are stationary and which may each be divided into three groups corresponding to the following functions:

(a) generation of a laser beam,
(b) deflection of the beam, so that it follows the center of the target 4,
(c) measuring the tracking error.

FIG. 2 shows one sub-system including a linearily polarized laser source 7, followed by a quarter-wave plate 8 permitting to optically isolate it, and by a collimator 9 conceived to expand the beam to a convenient diameter. These components belong to the first group.

The second group of components consists of two plane mirrors 10, 11, which are each driven by a brushless DC motor 12 and 13 respectively, the pivot axes 14 and 15 respectively of the two mirrors being mutually perpendicular in order to deflect the beam 36 onto the target in a working volume in which this target is allowed to move. The mirrors 10, 11 are mounted in an overhanging manner on a shaft of the motor 12, 13, to which is further coupled a shaft angle encoder 16, 17. Gas bearings support the shaft on either side of the motor 12, 13.

FIG. 3 shows an alternative arrangement of a mirror such as 10', of the corresponding motor 12' and of the encoder 16'. In this case, the mirror is located between the motor and the encoder on a common shaft which is guided between two gas bearings 34 and 35. It is apparent that such an arrangement still improves the mechanical stability of the mirror and reduces the danger of wobble oscillations of the common shaft.

The third group of components of the sub-system is constituted by a lateral effect photodetector 18 and by a beam splitter 19, the latter being interposed between the collimator 9 and the two mirrors 10, 11. Filters (not shown) are fitted in between the beam splitter 19 and the photodetector to cut out ambient light.

If the mirrors 10, 11 are conveniently positioned, the beam 37 is directed to the cat's eye reflector, which constitutes the target 4 on the robot head 1. A cat's eye reflector is a glass body composed of two hemispheres of different diameters. The outer surface of the larger diameter hemisphere reflects the beam in such a way that the return beam coincides with the incident beam only if the latter passes through the center of the two hemispheres. In the other cases, the cat's eye reflects the beam parallel to the incident beam, the distance between both beams depending upon the distance from this center at which the beam passes through the virtual plane orthogonal to the incident beam passing through the hemisphere's center.

In order to make the laser beam 37 follow the center of the target 4, this distance is measured in the lateral effect photodetector 18, which receives the return beam after its repeated reflection on the two mirrors 10 and 11 and after its deviation from the main path by the beam splitter 19. The lateral effect photodetector 18 supplies signals at these four electrodes 20, 21, 22, 23, from which the position of the center of the beam on the active surface of the photodetector can be deduced. These signals are then used to close the control loop and to activate the motors 12 and 13 of the mirrors 10 and 11 in such a way that the beam finally points at the center of the cat's eye. In this case, the distance between the incident and the reflected beam tends to become zero.

The flow of the electrical signals in this control loop is shown in FIG. 4.

The output signals of the lateral effect photodetectors 18 are amplified in amplifiers 24 and are applied to a sample circuit 25. This circuit further receives a synchronisation signal 26 coming from a master computer 27. The output of this circuit 25 is connected to an analog to digital converter 28 which delivers the present beam position in digital form to a microprocessor 29.

This microprocessor 29 further receives manual control signals via a line 30, a synchronisation signal via a line 31 from the master computer 27, and the digital position signal delivered by the encoders 16 and 17 of the mirrors 10 and 11.

The microprocessor 29 delivers position control signals for the motors 12 and 13 in accordance with the digital signals indicating the beam position and being delivered by the analog to digital converter 28, as well as the present mirror positions supplied in digital form via lines 32 and 33. The microprocessor comprises a state-space controller which is conceived to eliminate oscillations from the systems including the mirrors, the motors and their drive amplifiers.

The present mirror positions and the present beam position are further signalled to the master computer 27 which deduces the space coordinates of the center point of the cat's eye.

It should be noted here that it is not necessary for a correct tracking of the head that the beam passes through the center of the cat's eye. The distance between the point of beam incidence and the cat's eye center being continuously measured by the lateral effect photodetectors and being available in the microprocessor 29, the triangulation can take place, even if the beam does not pass exactly through the center of the cat's eye. This facilitates the control of the mirror position.

FIG. 5 shows a typical frequency response of a mirror drive system including the mirror, its motor and its drive amplifiers. The abscissa shows the frequency in radians per second and the ordinate represents the amplitude ratio. The upper curve constitutes the frequency response without dynamic state-space controller, whereas the lower curve represents the response obtained due to this controller. It can be seen that the response is very flat and that it does not show any resonance phenomenon.

The improvement of the system according to the invention over the above quoted known robot head tracking system is notable. It should be possible to track a robot head at a positional accuracy of ±0,5 mm in a working volume of up to 1 m$^3$, the maximum robot head speed being 5 m/sec.

In spite of this high performance of the system according to the invention, it is still possible that the tracking of the robot head be lost, for example due to a shadowing effect. If the return beam does not fall any more on the cat's eye, the mirror tracking control loop must be broken and an open loop position search phase must be performed. This might be a manual search, but it is more convenient to use the existing digital calculation facilities for programming an automatic search procedure and to activate this procedure automatically, as soon as no more signals are produced by the lateral effect detector. This automatic search mode is again abandoned as soon as the return beam passes through the light sensitive area of the detector. This re-capture time is typically one or two seconds.

We claim:

1. A target tracking system comprising two identical stationary and mutually distant sub-systems (5, 6), each of said sub-systems including a laser source (7) and two orthogonally pivotable mirrors (10, 11) such that a laser beam (37) can be directed by each sub-system towards a target (4), each of said sub-systems further including a laser light-sensitive detector 18 receiving said laser beam after its reflection the target, said target being a cat's eye type reflecting target, the pivot position of the mirrors (10,11) being adjustable under the control of signals derived from the respective detector (18), such that the respective beam tends to approach the center of the target (4) and to be reflected in itself, the system further comprising means (16, 17) for detecting the present position of the mirrors, and calculator means evaluating the present 3D coordinates of the target on the basis of the mirrors pivot positions, and wherein each of said mirrors (10, 11,) in said sub-systems (5, 6) is pivotably driven by a brushless DC motor and the mirrors are further coupled to a digital angle encoder (16, 17).

2. A target tracking system according to claim 1, wherein the angle encoder (16, 17) is located close to the associated motor (12, 13).

3. A target tracking system according to claim 1, wherein at least one of said mirrors (10') is located on a shaft between its corresponding motor (12') and encoder (16').

4. A target gtracking system according to claim 1, wherein the two brushless DC motors (12, 13) for driving the mirrors (10, 11) of each of said sub-systems (5 or 6) are controlled by digital signals which are calculated in accordance with the output signals of the detector (18), and with an error signal depending on the present difference between the present mirrors position and the requested mirrors position.

5. A target tracking system according to claim 1, wherein the detector (18) of each of said sub-systems is constituted by a lateral effect photodetector supplying signals representative of the orthogonal coordinates of the center of the incident light beam.

6. A target tracking system according to claim 1, wherein each of said sub-systems includes a mode control device distinguishing at least between the normal tracking mode and an automatic search mode in which the mirrors are pivoted according to a predetermined program, the transition between the modes being controlled by the detector output signal.

7. A target tracking system according to claim 1, wherein the mirrors pivot control signals of each of said sub-systems are submitted to a state-space controller conceived to eliminate resonances of the mirrors and of its drive amplifiers.

* * * * *